May 18, 1965

R. E. RAYMOND 3,183,790

HYDRAULIC FEED CONTROL APPARATUS

Filed Nov. 14, 1962

INVENTOR.
ROBERT E. RAYMOND

BY
Schmieding and Fultz

ATTORNEYS

May 18, 1965

R. E. RAYMOND 3,183,790

HYDRAULIC FEED CONTROL APPARATUS

Filed Nov. 14, 1962

INVENTOR.
ROBERT E. RAYMOND

BY

*Schmieding and Fultz*

ATTORNEYS

INVENTOR.
ROBERT E. RAYMOND
BY
Schmieding and Fultz
ATTORNEYS

INVENTOR.
ROBERT E. RAYMOND

May 18, 1965  R. E. RAYMOND  3,183,790
HYDRAULIC FEED CONTROL APPARATUS
Filed Nov. 14, 1962  15 Sheets-Sheet 9

INVENTOR.
ROBERT E. RAYMOND
BY
Schmieding and Fultz
ATTORNEYS

May 18, 1965

R. E. RAYMOND 3,183,790

HYDRAULIC FEED CONTROL APPARATUS

Filed Nov. 14, 1962

*INVENTOR.*
ROBERT E. RAYMOND

BY
*Schmieding and Fultz*

ATTORNEYS

May 18, 1965     R. E. RAYMOND     3,183,790
HYDRAULIC FEED CONTROL APPARATUS

Filed Nov. 14, 1962     15 Sheets-Sheet 11

INVENTOR.
ROBERT E. RAYMOND
BY
Schmieding and Fultz
ATTORNEYS

INVENTOR.
ROBERT E. RAYMOND
BY Schmieding and Fultz
ATTORNEYS

INVENTOR.
ROBERT E. RAYMOND
BY
Schmieding and Fultz
ATTORNEYS

May 18, 1965  R. E. RAYMOND  3,183,790
HYDRAULIC FEED CONTROL APPARATUS
Filed Nov. 14, 1962   15 Sheets-Sheet 14

*INVENTOR.*
ROBERT E. RAYMOND
BY
*Schmieding and Fultz*
ATTORNEYS

INVENTOR.
ROBERT E. RAYMOND
BY
Schmieding and Fultz
ATTORNEYS

United States Patent Office 3,183,790
Patented May 18, 1965

3,183,790
HYDRAULIC FEED CONTROL APPARATUS
Robert E. Raymond, 131 Norcross Road,
Zanesville, Ohio
Filed Nov. 14, 1962, Ser. No. 237,577
22 Claims. (Cl. 91—435)

This invention relates to apparatus for controlling the velocity of movement of hydraulic cylinders.

One of the most difficult phases of fluid power today is the problem of accurate feed of linear hydraulic cylinders. To date, there are two broad methods of control approach to the feed problem involving regulator types of devices which are attempting to maintain a feed rate regardless of variations in the system or load conditions.

The most popular method of feed control exists in the employment of hydraulic valve techniques within the hydraulic circuit itself. This means that pressure compensated flow control valves of one sort or another are employed to meter the hydraulic fluid of a controlled rate into a particular system. The pressure difference across a flow restriction in the line, which is a function of flow, is fed back to spools or mechanisms to adjust a valve or pump control. In effect, this is truly a rate control since there is no knowledge of the position of the hydraulic cylinder. All that is sensed is that a flow rate has occurred for a certain period of time and which should have integrated into a certain cylinder ram position according to flow rate and time.

The difficulty with this type of control, no matter what the degree of ingenuity may be, is that the inherent leakage and jet force reactions are errors that are not detected. In addition, changes in viscosity or variation of the control orifice due to load, temperature, etc., all effect the actual rate of flow being delivered to the cylinder. Basically, it is very easy to prove that this type of control is not sound for extreme accuracy and dependability over a wide range of conditions. Pressure compensated feed valve techniques are actually an approximation of feed control and should be considered, at best, as only relatively accurate means for maintaining the speed or position of the cylinder.

This is particularly true with very low speed applications where the rate of flow through the valve is extremely low and therefore errors that occur in the valve and system may be of much greater magnitude than the actual variable being controlled. Drift, stall out, and other problems associated with valves or pumps operating at low flows are a common thing in hydraulics today.

The second method for handling feed problems revolves around measuring the actual displacement and/or rate of the actuator by some external mechanical or electronic means and comparing this measurement with a command input, the difference being used to operate an amplifier control system to maintain the feed. The popular means for doing this has been to utilize electronic types of cylinder ram speed detection and position and feed this back to electronic amplifiers and electro-hydraulic servo valves to perform the control function. The electronic approach is, of course, valid from a physics point of view but is rather expensive and very difficult for the average shop men to service or comprehend in its function. In addition, electronic equipment is sensitive to the environment and has many shortcomings from an overall view.

In addition to the electronic types of position or velocity feedback, there are mechanical methods which utilize rack and gear drives thatt actuate hydraulic valves to maintain a ram speed or position. The most popular use of this type of mechanical rack drive has not been for determining the linear speed of a single actuator but rather for the maintaining of synchronization between two actuators where the difference in the two actuators' displacement operates a valve so that the error is reduced. In this way, one actuator is actually geared as a slave to a master actuator and commanded to perform exactly in position and velocity correspondence to the master actuator.

In all of the methods that are currently being used for feed control, there are serious disadvantages in that they do not effectively generate and maintain accurate feed with simple, reliable, and economically priced units which can be offered in the form of standard units with wide and versatile control. All popular valve flow control methods are basically unable to maintain an accurate feed, say in the neighborhood of 1% or less, and in most cases they cannot maintain better than 5% accuracy.

On the other hand, the mechanical methods which employ racks or other rather complex mechanical means are too expensive and cumbersome, and they must be engineered to a particular job. Therefore, this cannot be effectively applied over a wide range of applications.

In general, the hydraulic cylinder feed control of the present invention is based on the direct measurement of the controlled velocity of cylinder movement by mechanical means and comparing this direct measurment of the variable with an accurate synchronous timing command whereby the error is usd to operate a primary hydraulic control valve.

Instead of measuring cylinder velocity with racks, gears or other mechanical devices which are difficult to align, bulky, and costly, the present apparatus utilizes a steel tape which can be attached to cylinders of any size without complex alignment problems and without consuming appreciable space. The tape control is adjustable to a wide range of cylinder strokes, cylinder diameters, and speed setting for almost any kind of application. This construction therefore satisfies the mechanical measurement problem that is so difficult with devices such as the rack and gear mechanisms previously discussed. Moreover the steel tape is rigid in the sense that it does not yield appreciably under control loads and therefore it can give an accurate account of mechanical motion in a simple manner.

The general principle of the present feed control is to allow the hydraulic cylinder being controlled to move forward under hydraulic power, pulling the tape along with it. At the same time, a synchronous motor, through proper gearing and speed control means, is employed to drive an input metering drum over which the tape passes. If the cylinder velocity exceeds the synchronous command speed, such that the tape is being pulled out faster than it is being metered out by the metering drum the tape movement is arranged to actuate a hydraulic valve which reduces the flow to the cylinder and thereby reduces the cylinder speed so that the tape will again proceed at the synchronous speed commanded by the input timing motor. On the other hand, if the tape is moving slower than the metering drum is letting the tape out, then the tape movement is arranged to allow the valve to open, which increases the hydraulic flow and thereby brings the cylinder speed up to the synchronous speed and pulls the tape out at such a rate as to equal the synchronous command speed.

The input metering drum is driven through a gear train and variable speed transmission so that the drum speed can be infinitely adjusted to any desired level within a certain range. This means that the metering control is able to force the cylinder to follow the synchronous speed of the tape, and therefore variable speed control is accomplished in a simple manner.

The typical mechanism disclosed in the present application is arranged for declutching, variable speed, and a wide range of hydraulic power requirements. The valves are designed for a maximum pressure of 3000 p.s.i. and a maximum flow of 6 g.p.m. (10 H.P. maximum power conditions). The synchronous motor and gear drive input is capable of 1/200 H.P. and therefore provides a very low power control for the hydraulic system.

Use of a coil spring powered tape drum provides an accumulator for the steel tape whereby the tape is metered out and recalled as the cylinder is moved forward or reversed.

As another feature, a simple clutch mechanism permits disengagement of the metering drum from the tape so that the cylinder being controlled can be reversed or rapidly advanced as desired.

The control apparatus of the present invention includes other auxiliary features such as safety switches and sensitivity adjusting means all of which are present in a compactly packaged mechanism.

It should be pointed out that with the feed control of the present invention, a time metering process is accomplished by mechanical and hydraulic means with no electronic devices being required. All of the parts are readily accessible and understanding of the mechanism is easily accomplished by shop personnel. Maintenance of the equipment is straightforward. The tape control is adjustable over a wide range of strokes, cylinder sizes, and feed rates as well as being adaptable to gear, vane, or piston pumps over a pressure range of 0–3000 p.s.i. Moreover, problems such as variation in viscosity, temperature changes, and many other parasitic conditions which are present in hydraulic systems do not effect the operation of the feed control.

It is extremely easy to adapt the control to existing systems as a supplementary control thereby avoiding redesigned systems.

As another aspect of the present invention, the application of the feed control can be expanded to synchronizing cylinders and certain lunge control techniques.

It is therefore an object of the present invention to provide a hydraulic cylinder feed control that provides a high degree of feed control accuracy in the order of 1% or less.

It is another object of the present invention to provide an apparatus of the type described in the form of a compactly packaged mechanism which can be attached to cylinders of any size without complex alignment problems and without consuming appreciable space.

It is another object of the present invention to provide an apparatus of the type described that is adjustable for use with wide ranges of cylinder stroke, cylinder diameter, and cylinder operating speeds.

It is another object of the present invention to provide a hydraulic cylinder feed control that utilizes a simple flexible tape and associated mechanical components of simple construction which eliminate the need for expensive and complicated electronic devices.

It is another object of the present invention to provide an apparatus of the type described that employs a simple flexible tape and associated pulley means which eliminate the need for bulky and costly rack and gear mechanisms.

It is another object of the present invention to provide an apparatus of the type described that can be adjusted to provide an infinite number of cylinder speeds within a given control range.

It is another object of the present invention to provide an apparatus of the type described that includes a flow control valve means for controlling the main flow to the hydraulic cylinder and a second flow control means in the form of a compensator valve which greatly adds to the versatility of the apparatus in that various control functions can be performed and various types of pumps can be most efficiently used depending on the requirements of the particular system.

It is another object of the present invention to provide an apparatus of the type described that includes a simple clutch mechanism that permits reverse or rapid advance of the hydraulic cylinder being controlled.

It is another object of the present invention to provide an apparatus of the type described that includes other auxiliary features such as sensitivity adjusting means and safety switches.

Further objects and advantages of the present invention will be apparent from the following description, reference being had to the accompanying drawings wherein a preferred form of embodiment of the invention is clearly shown.

Figure 1:
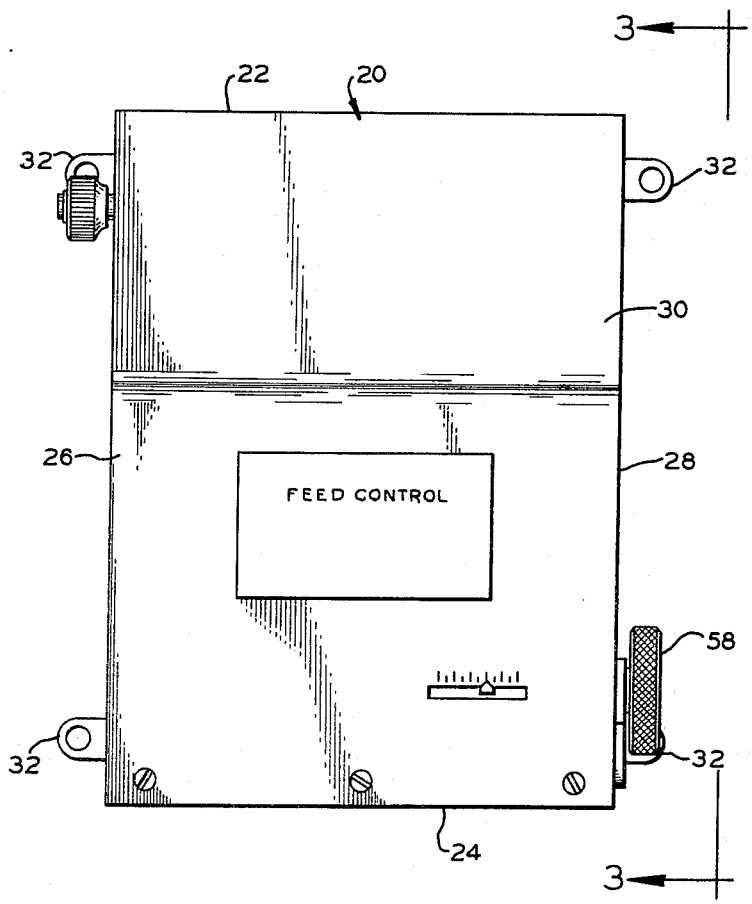
FIG. 1 is a front elevational view of a hydraulic cylinder feed control constructed in accordance with the present invention.

Referring in detail to the drawings, FIG. 1 illustrates a hydraulic feed control constructed in accordance with the present invention that comprises a casing means indicated generally at 20 which includes a top wall 22, bottom wall 24, side walls 26 and 28 and a front wall 30. The apparatus is adapted for wall mounting by a plurality of brackets 32.

Figure 2:
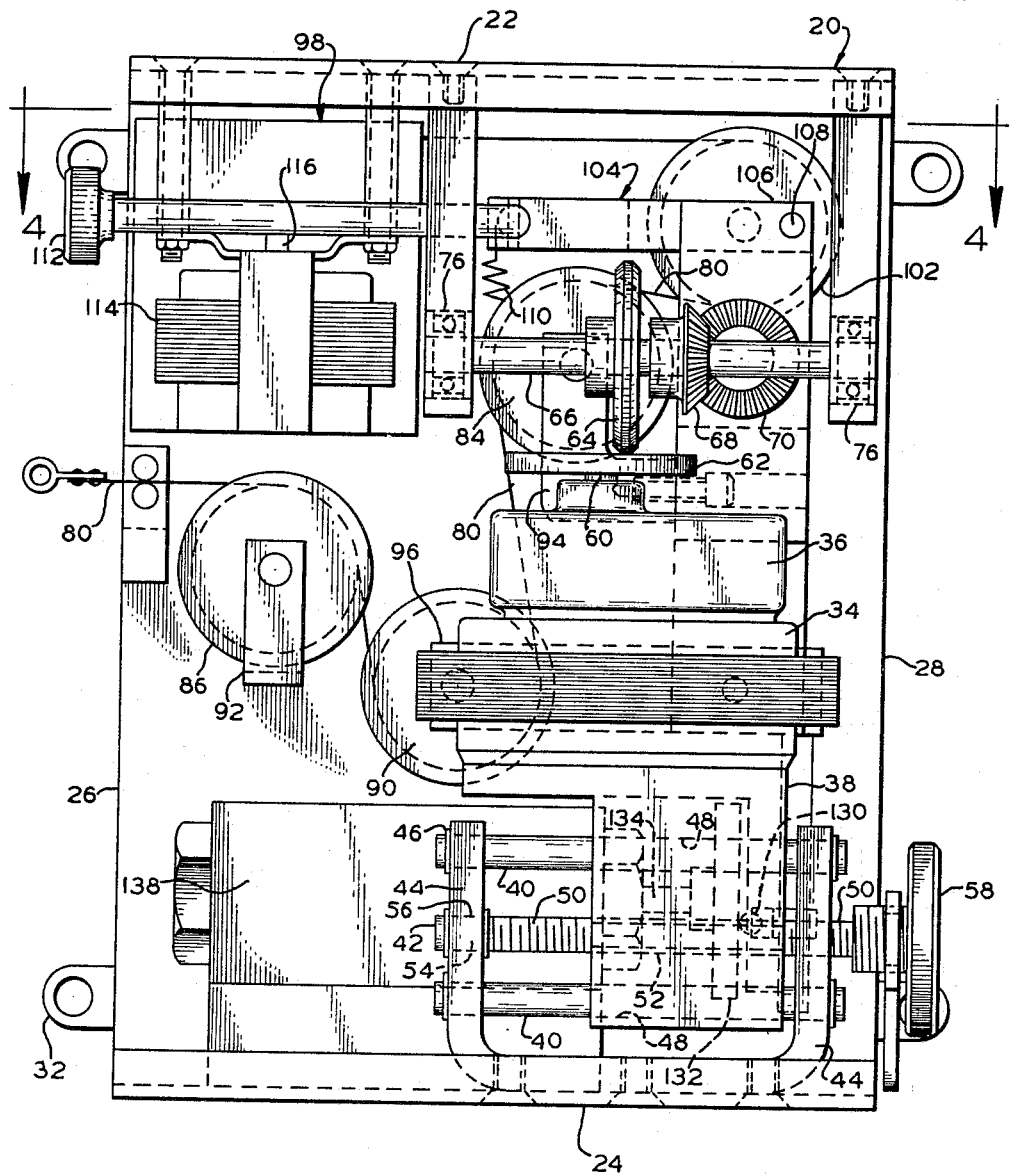
FIG. 2 is a front elevational view of the interior mechanism of the apparatus of FIG. 1 the section being taken along the line 2—2 of FIG. 3.
Figure 3:
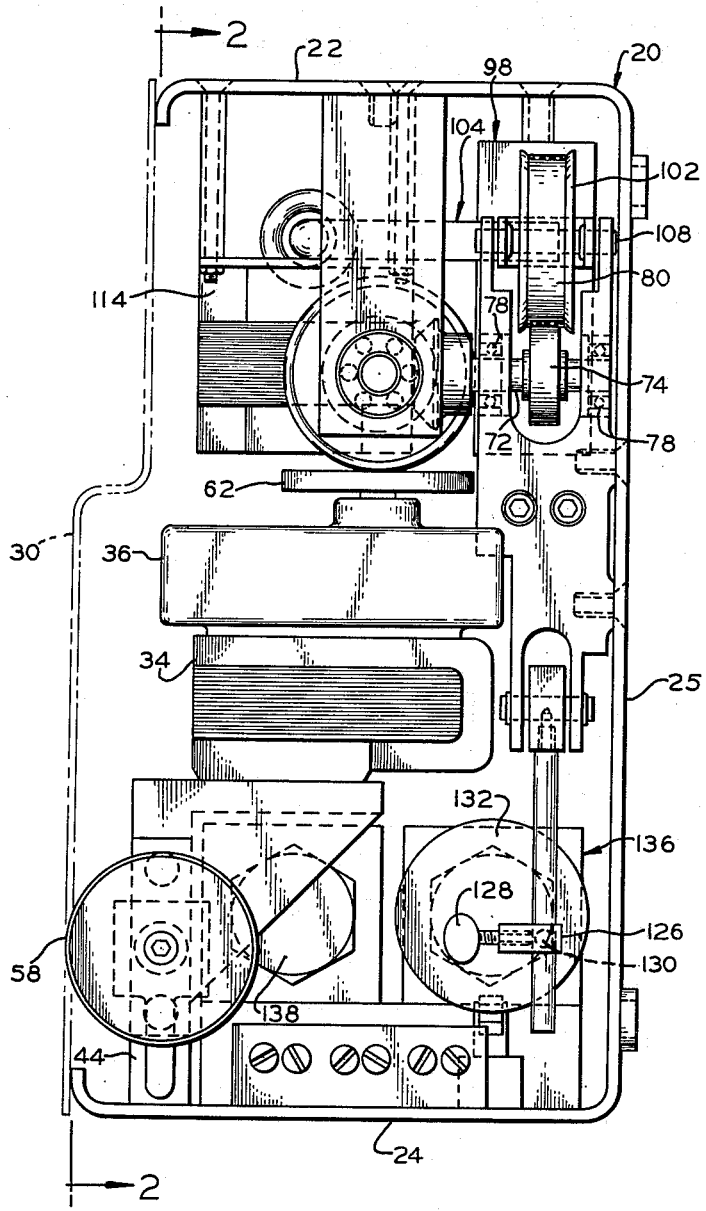
FIG. 3 is a side elevational view of the interior mechanism of FIG. 2 the section being taken along the line 3—3 of FIG. 1.
Figure 4:
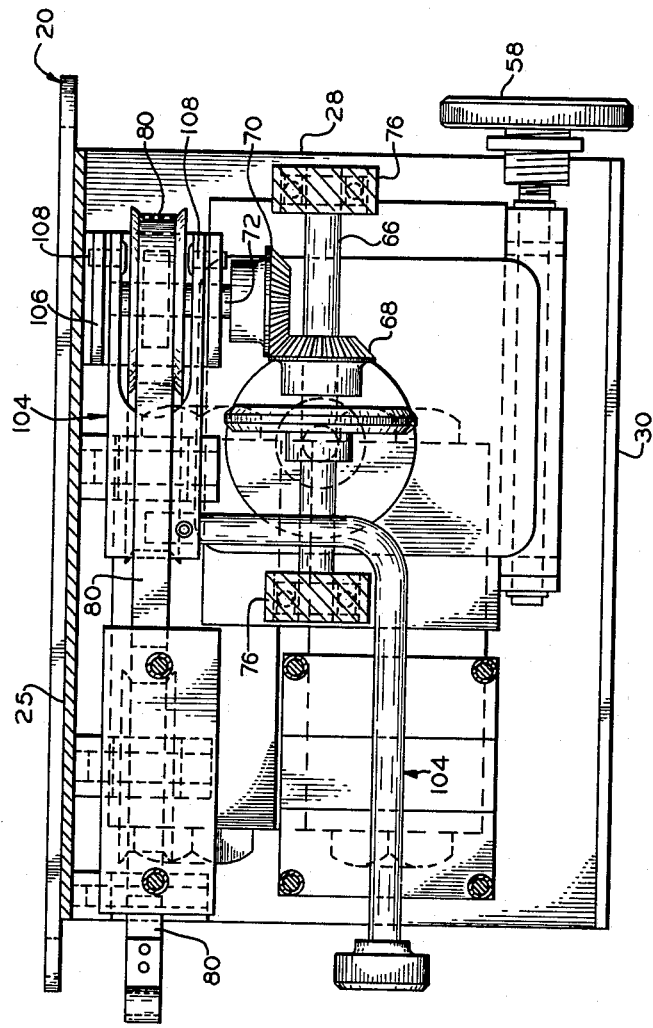
FIG. 4 is a top elevational view of the interior mechanism of the apparatus of the preceding figures the section being taken along the line 4—4 of FIG. 2.
Figure 5:
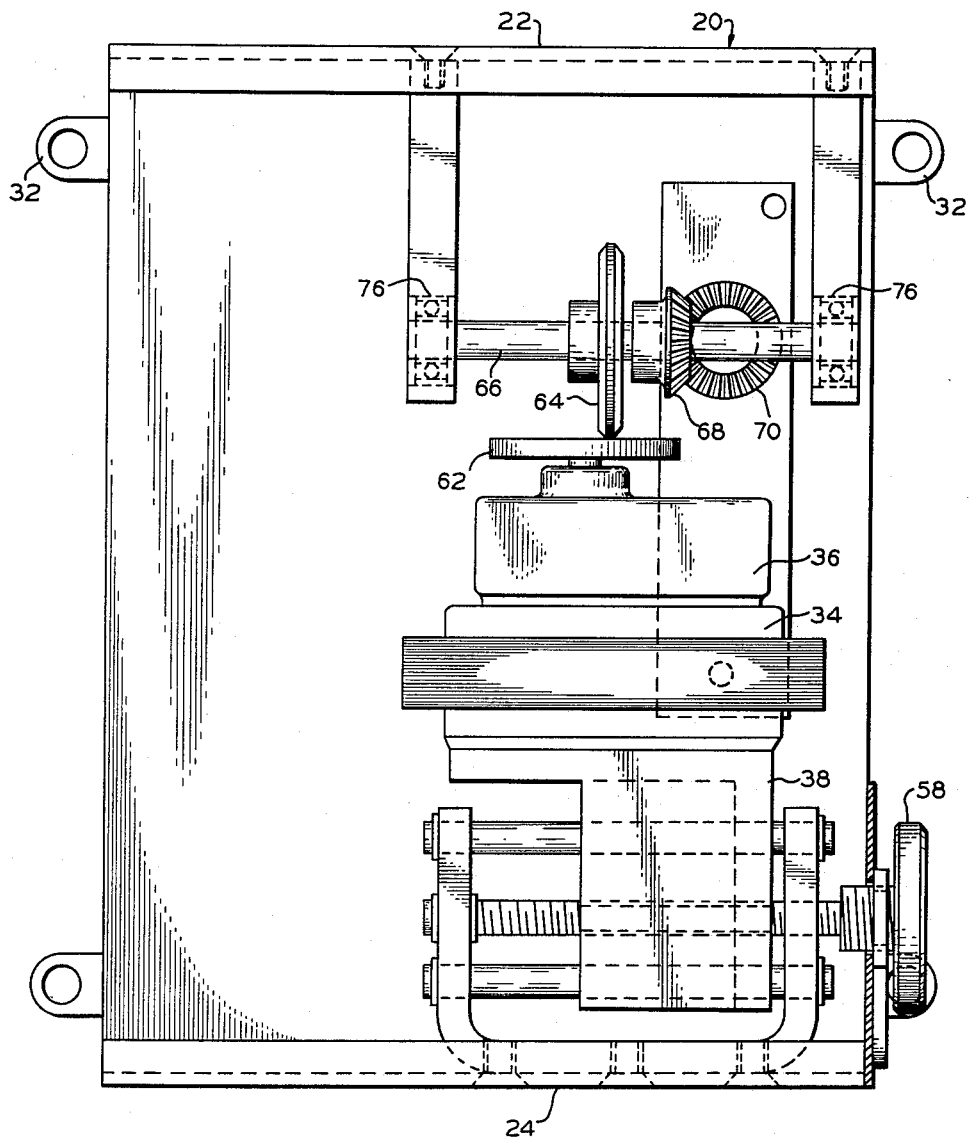
FIG. 5 is a partial front elevational view showing a portion of the mechanism of FIGS. 2–4.
Figure 6:
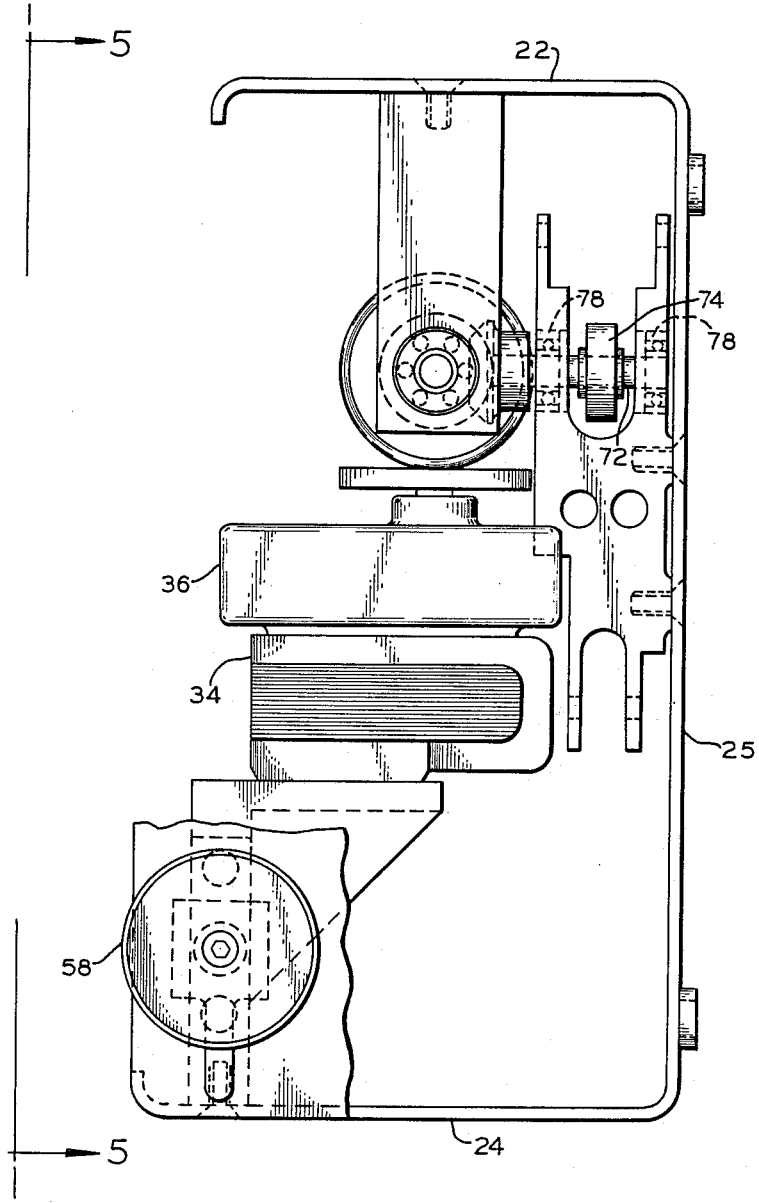
FIG. 6 is a partial side elevational view of a portion of the mechanism of FIGS. 2–4.
Figure 7:
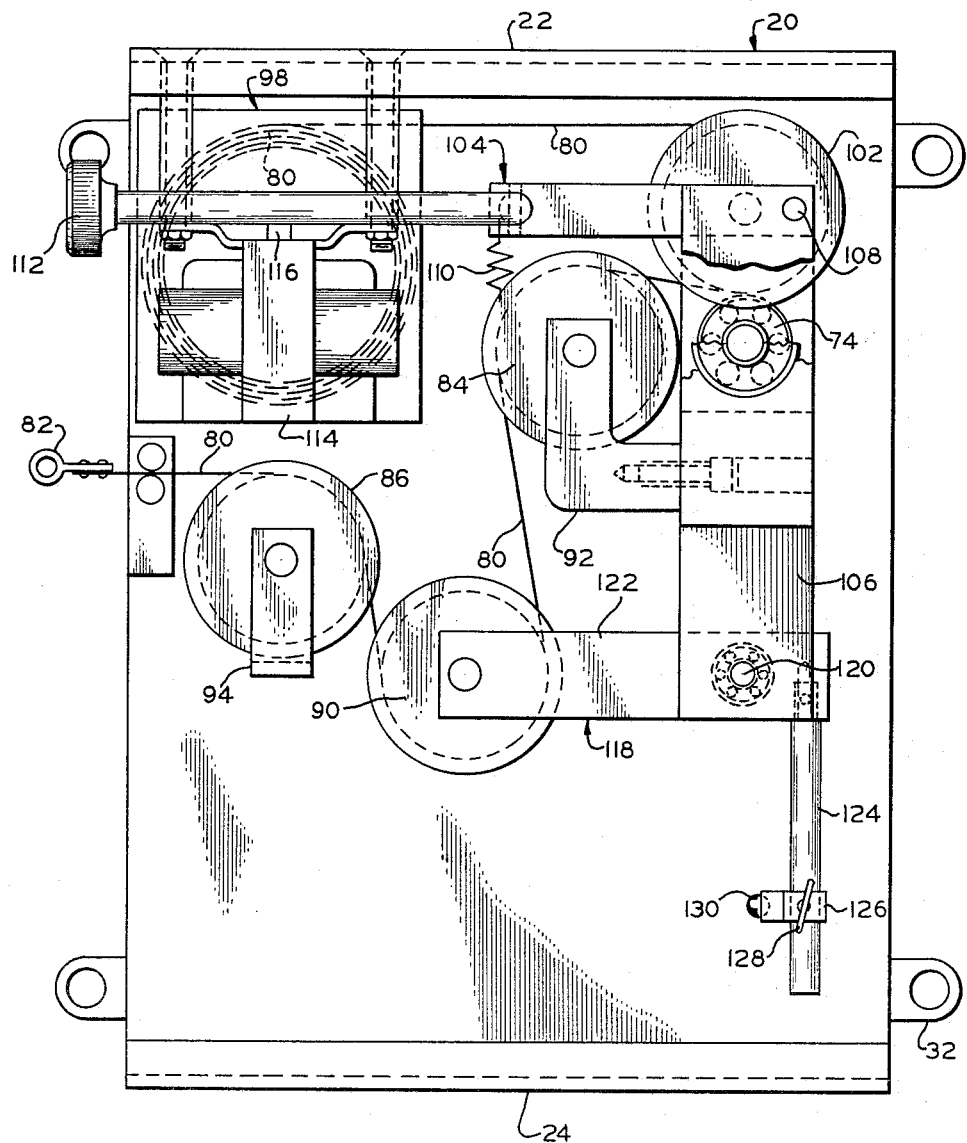
FIG. 7 is a partial front elevational view of a portion of the mechanism of FIGS. 2–4.
Figure 8:
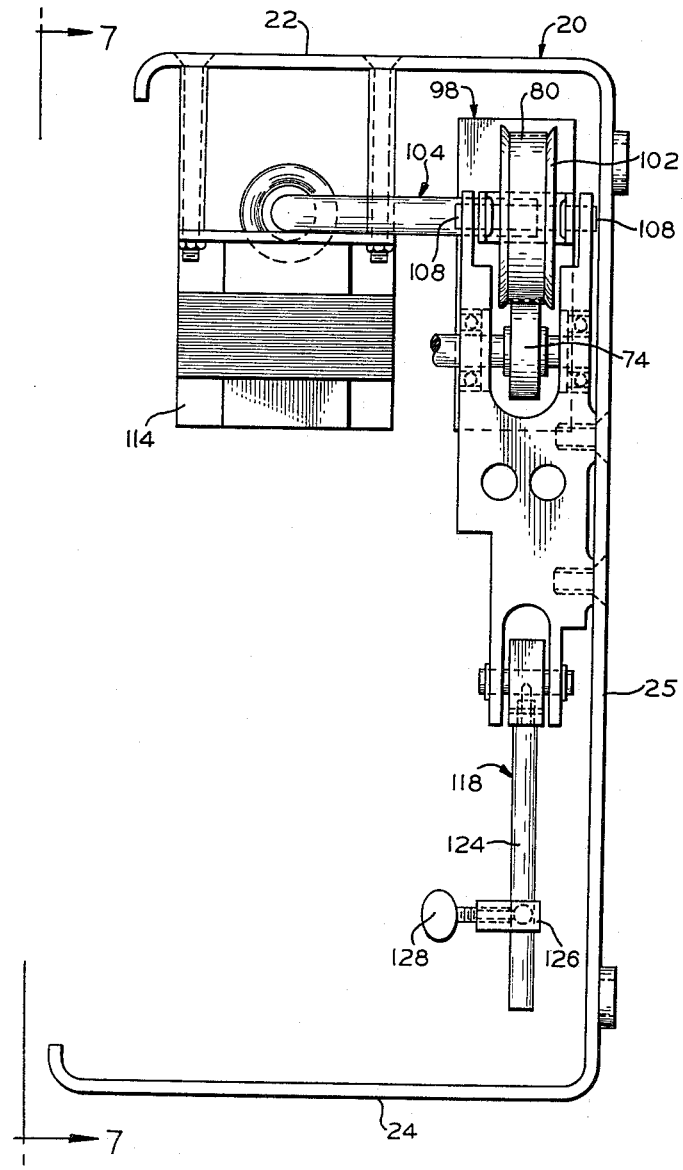
FIG. 8 is a partial top elevational view of a portion of the mechanism of FIGS. 2–4.

The interior mechanism of the unit of FIG. 1 is illustrated in its entirety in FIGS. 2–4 whereas FIGS. 5 and 6 illustrate a synchronous motor speed input subassembly and FIGS. 7 and 8 illustrate a tape metering apparatus subassembly.

*The synchronous motor speed input apparatus*

Referring particularly to FIGS. 1–6, synchronous motor 34 and speed reduction unit 36, mounted thereon, are supported by a movable motor mount 38, the latter being movable along motor guide rods 40 by a motor base adjusting screw 42. The guide rods 40 are attached to the frame means by a U-shaped bracket 44 and retained thereon by snap rings 46, said rods being extended freely through bores 48 in motor mount 38.

Motor base adjusting screw 42 includes a threaded shank 50 in threaded engagement with a bore 52 in motor mount 38 and is provided with unthreaded bearing portions 54 that extend freely through bores 56 in bracket 44.

Motor mount adjusting screw 42 further includes a feed adjusting knob 58 which, when rotated, axially shifts synchronous motor 34 and gear reduction unit 36 to any desired position along guide rods 40.

With continued reference to FIGS. 2–6, an output shaft 60 of the gear reduction unit drives a speed input disk 62 which is frictionally engaged by a speed output disk 64 keyed to a shaft 66.

A beveled gear 68 is also keyed to shaft 66 and drives a second beveled gear 70, the latter being keyed to a shaft 72 that drives a tape metering drum 74.

Shaft 66 is rotatably mounted to the frame means by bearing assemblies 76 and the smaller shaft 72 that carries the metering drum is rotatably supported by bearing assemblies 78.

Tape metering drum 74 functions to frictionally engage and drive a flexible steel tape 80 that comprises a portion of the tape metering apparatus next to be described.

*The tape metering apparatus*

With reference to FIGS. 2 through 8 the previously mentioned flexible tape 80 includes an end adaptor 82 for attachment to the ram of a hydraulic cylinder to be controlled.

As is best seen in FIG. 7, tape 80 is released and retrieved by a tape reel and return spring assembly indicated generally at 98, with the coil spring, not illustrated, serving to instantly bias the tape reel in a counter clockwise direction of rotation as viewed in FIG. 7. Hence it will be understood that the tape reel and return spring assembly 98 constantly tends to draw in the tape in opposition to movement of the cylinder ram to which the end adaptor 82 is attached.

Tape 80, after leaving return spring assembly 98 passes around a tape metering pulley 102 and is frictionally clamped between the outer surface of the metering pulley and the previously mentioned tape metering drum 74.

Tape 80, FIG. 7, is next passed over an upper idler pulley 84, a summing pulley 90, and a lower idler pulley 86, said idler pulleys being mounted to the frame by brackets 92 and 94.

A main clutch arm, best seen in FIGS. 4, 7, and 8 is indicated generally at 104 and includes an inner end pivotally mounted to a clutch mounting bracket 106 by the clutch arm pivot pins 108.

Clutch arm 104 is constantly biased downwardly by a tension spring 110 whereby tape metering pulley 102 is caused to frictionally clamp tape 80 into frictional engagement with tape metering drum 74. The frictional engagement can be released manually by a clutch adjustment knob 112 on the outer end of clutch arm 104 and, if desired, electric declutching can be accomplished by energizing a solenoid 114 which causes an armature 116 of the solenoid to extend upwardly and lift clutch arm 104 and tape metering pulley 102.

The previously mentioned summing pulley 90 is mounted on a summing pulley lever 118, FIG. 7, which is pivotally mounted to mounting bracket 106 at a lever pivot 120 said lever including a horizontally extending arm 122 and a vertically extending arm 124, the latter including a vertically adjustable valve actuating member 126. This member can be moved to various vertical positions by loosening and tightening a locking screw 128. Such adjustment varies the effective length and hence the valve actuating movement of vertical lever arm 124.

Referring particularly to FIGS. 2 and 3 it will be seen that valve actuating member 126 includes a ball tip 130 in depressing engagement with a plunger disk 132 mounted on a spool actuating plunger 134 of a flow control valve indicated generally at 136.

In general, flow control valve 136 and a compensator valve indicated generally at 138, FIGS. 2 and 3, function to control the flow of hydraulic fluid to the cylinder being controlled and the various circuitry for these valves, for performing various flow control functions, are described in detail in FIGS. 9 through 21.

*The meter in by-pass flow control circuit*

Figure 9:
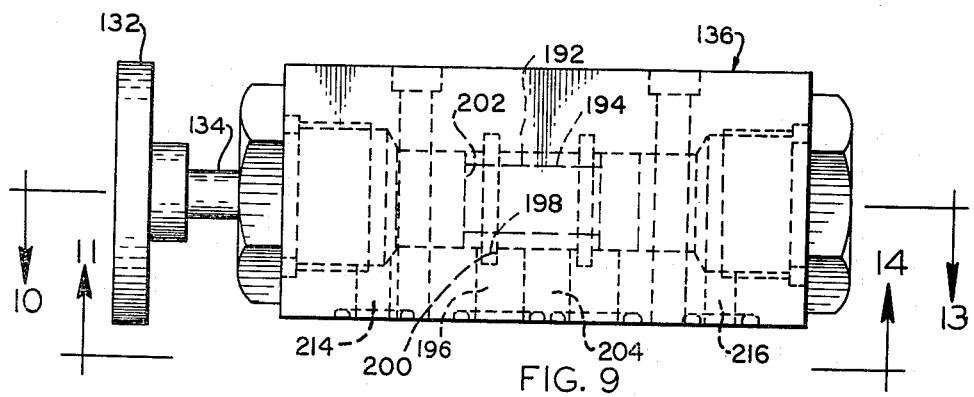
FIG. 9 is a side elevational view of a flow control valve comprising a portion of the apparatus of the present invention.
Figure 10:
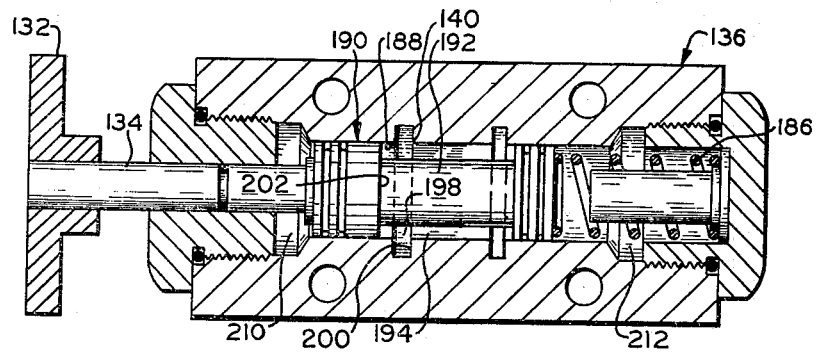
FIG. 10 is a top sectional view of the valve of FIG. 9 the section being taken along the line 10—10 of FIG. 9.
Figure 11:
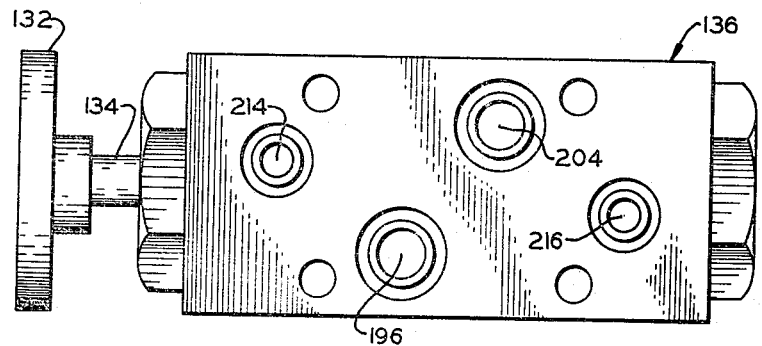
FIG. 11 is a bottom elevational view of the valve of FIGS. 9 and 10.
Figure 12:
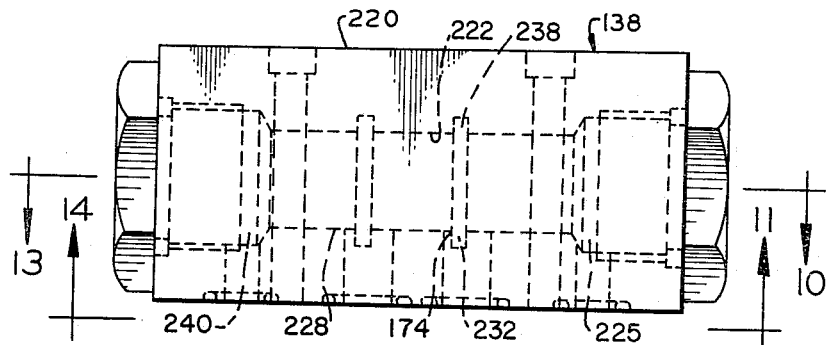
FIG. 12 is a side elevational view of a compensator valve comprising a portion of the apparatus of the present invention.
Figure 13:
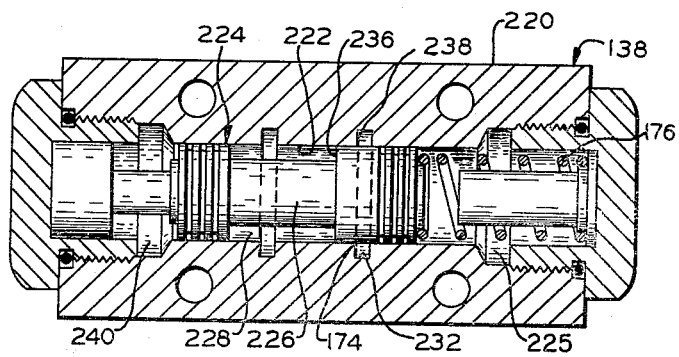
FIG. 13 is a top sectional view of the valve of FIG. 12 the section being taken along the line 13—13 of FIG. 12.
Figure 14:
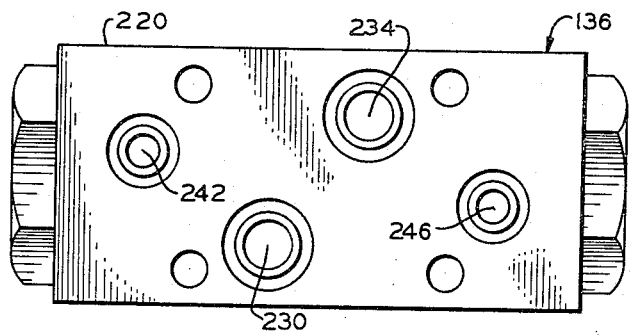
FIG. 14 is a bottom view of the valve of FIGS. 12 and 13.
Figure 15:
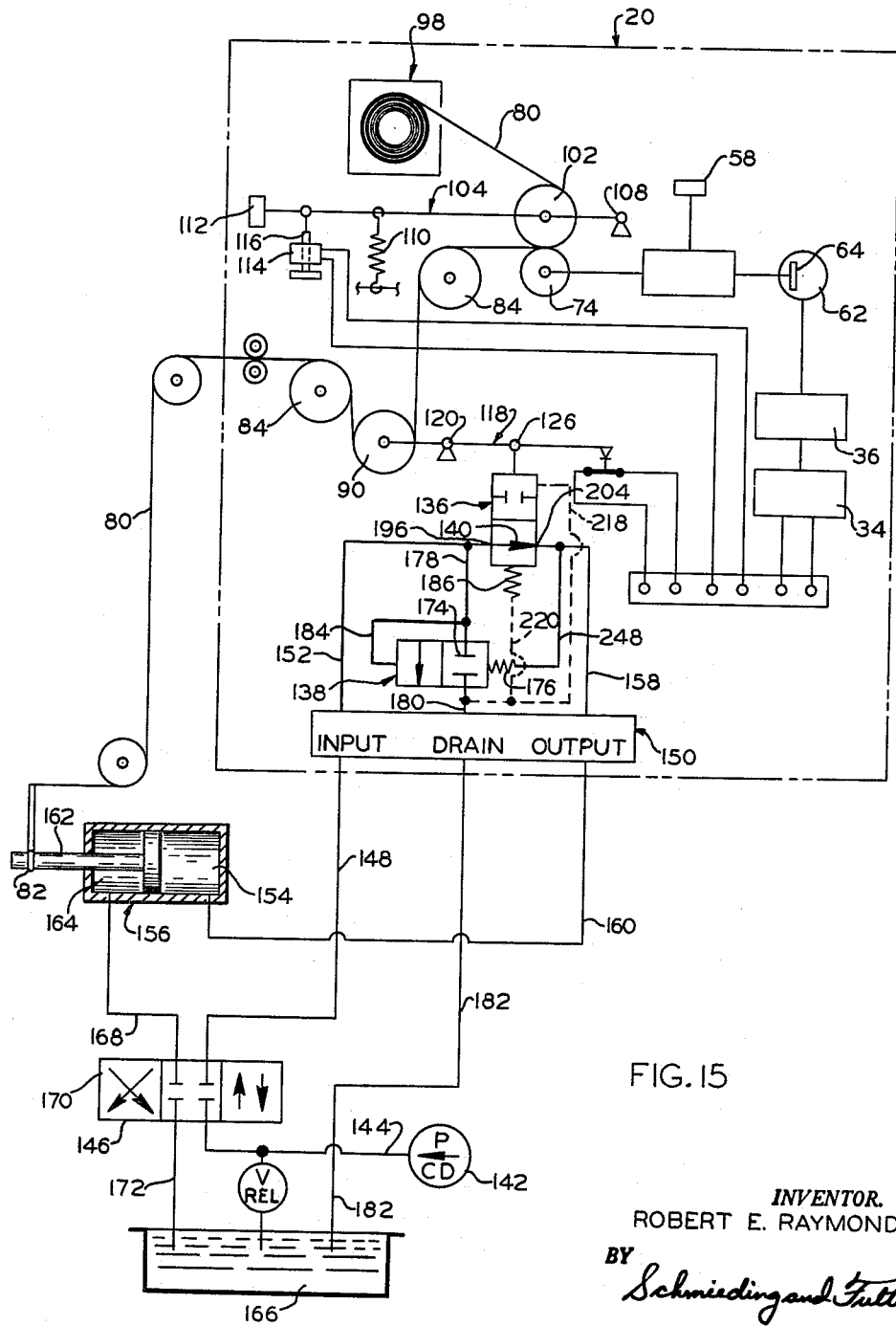
FIG. 15 is a diagrammatic view of the apparatus of the present invention showing hydraulic circuitry for the valves to provide meter in by-pass control operation.

Reference is next made to FIG. 15 which schematically illustrates operation of the hydraulic cylinder feed control apparatus with the flow control valve 136 and compensator valve 138 and also to FIGS. 9 through 11 which illustrate the previously mentioned flow control valve 136 and FIGS. 12 through 14 which illustrate the previously mentioned compensator valve 138.

Flow control valve 136 includes a flow control orifice 140 that receives a flow of hydraulic fluid from a pump 142 via a line 144, directional valve 146, line 148, hydraulic manifold 150, and line 152.

The flow leaving flow control orifice 140, in valve 136, is delivered to a pressurized chamber 154 of a hydraulic cylinder indicated generally at 156 via a line 158, hydraulic manifold 150, and line 160.

Hydraulic cylinder 156 further includes a ram 162 that performs work when extended by the delivery of pressurized fluid and a second chamber 164 that drains to a reservoir 166 via line 168, directional valve 170 and line 172.

With continued reference to FIG. 15, the previously mentioned compensator valve 138 includes a by-pass orifice 174 having an intake for receiving flow upstream from flow control orifice 140, by-pass orifice 174 being normally biased towards a closed position by a compression spring 176.

With this arrangement, it will be understood that when by-pass orifice 174 is open the pressurized flow of fluid in line 152 leading to control orifice 140 is short circuited to tank 166 via line 178, orifice 174, line 180, manifold 150, and line 182.

In operation, flow control orifice 140, being in series with the load (hydraulic cylinder 156), creates a pressure drop which is fed back to the end of the spool in compensator valve 138 via a line 184. This applies a hydraulic force to the left end of the spool in opposition to the mechanical bias imposed by compression spring 176 on the right end of the spool and the hydraulic bias applied by the downstream flow in line 248 on the right end of compensator spool 224, see FIG. 13. Then biases tend to close off by-pass orifice 174.

In view of the above it will be understood that as the flow tends to increase through flow control orifice 140 of the main flow control valve 136 the pressure drop across orifice 140 increases the pressure differential on the ends of by-pass spool 224 which opposes and exceeds the force exerted by spring 176 whereby by-pass orifice 174 is opened with the result that the excess flow is diverted to tank. Conversely, if the pressure drop across flow control orifice 140 tends to drop then the force exerted by compression spring 176 tends to close by-pass orifice 174 and divert the flow that was formerly going to tank into the main line 152 to feed the demands of flow control orifice 140.

It will now be understood that compensator valve 138 tends to maintain constant flow across flow control orifice 140 which monitoring action is modified by the tape feed control apparatus previously described.

In this particular application the system pressure is equal to the load pressure that is demanded to maintain the desired velocity of movement of the hydraulic cylinder. If the load tends to build up at ram 162 of cylinder 156 then the pressure in the hydraulic system automatically rises to maintain the flow across flow control orifice 140. This is dictated by the position of the spool and hence by the by-pass orifice 174 of compensator valve 138 when it receives pressure signals from the pressure drop across flow control orifice 140. Hence it will be understood that the load pressure in chamber 154 of cylinder 156 is a resultant of the action of the valve arrangement with its tendency to maintain constant flow.

If the load goes to zero or is lost then the pressure in the hydraulic system must drop to whatever is required by the load. This is automatically accomplished since by-pass orifice 174 in compensator valve 138 opens if excess pressure drop occurs across flow control orifice 140. Since, in this instance, the hydraulic pressure at the load is zero, the pressure upstream from flow control orifice 140 can be no greater than the force exerted by by-pass bias spring 176 because the spool in compensator valve 138 automatically opens to maintain this situation.

The meter in by-pass circuitry of FIG. 15 just described is applicable when a fixed displacement pump is used for the pressure source 142 in order to provide efficiency since the pressure is only as great as the load being operated. The oil that is by-passed to tank by compensator valve 138 is released at the maximum system pressure at any given instance. Under certain conditions, the by-pass flow represents a small percentage of the total flow through the system or the time during which the load pressure in the cylinder is high can be a small percentage of the total time of the feed cycle. In either case, economy of horsepower is realized as compared to other feed control circuits.

Referring to FIGS. 9 through 11, valve 136 includes a bore 188 that slideably carries a spool 190 the latter including a neck portion 192 that forms an annular chamber 194 that communicates with pressurized fluid from line 152, FIG. 15, via an inlet port 196, the latter being illustrated in FIGS. 9 and 11 and diagrammatically represented at 196 in FIG. 15.

The previously described main flow control orifice 140 is formed by the right edge 200 of an annular recess 198 in the valve housing, FIG. 10, and the left edge 202 of recess 194 in spool 190. It will be understood that when plunger disk 132 and spool actuating rod 134 force the spool to the right, the left recess edge 202 will arrive at a threshold position relative to the right edge 200 of annular recess 198. When threshold is reached pressurized fluid is restricted from recess 194 by closing recess 198.

Reference is next made to FIGS. 12 through 14 which illustrate the construction of compensator valve 138 which includes a housing 220 and a bore 222 in which is slideably mounted a spool indicated generally at 224.

A neck portion 226 of the spool forms an annular chamber 228 that communicates with pressurized line 152, FIG. 15, via line 178 and inlet port 230.

Pressurized fluid is released from annular chamber 228 via a second annular recess 232 and an outlet port 234 when a right edge 236 of annular spool chamber 238 is moved past a left edge 238 of annular recess 232. Hence it will be understood that edges 236 and 238 form the previously described by-pass orifice 174 of compensator valve 138.

Compensator valve 138, FIGS. 12–14, further includes a chamber 240 that is connected with pressurized line 152, FIG. 15, via line 178, line 184, and an inlet port 242. Hence it will be understood that when the pressure in chamber 240 of compensator valve 138 is increased, beyond the mechanical force exerted by the compensator spool return spring 176 and the downstream hydraulic force exerted on the right end of by-pass spool 224, then compensator spool 224 is shifted to the right to open by-pass orifice 174 whereby pressurized fluid is shortcircuited to tank 166.

Assuming that the main flow control orifice 140 is closed by the mechanical linkage previously described, as a result of a cylinder ram velocity in excess of the desired control velocity, then the flow of pressurized fluid being delivered to the pressurizing chamber 154 of hydraulic cylinder 156 is decreased with the resulting decrease in cylinder ram velocity.

Conversely, if a load condition occurs where the velocity of cylinder ram 162 falls below the desired control velocity dictated by the metered out speed of tape 80 summing pulley 90 and the left end of the summing pulley lever 118 is lowered, FIG. 15, then the right end of the lever and the valve actuating member mounted thereon are raised whereby main flow control orifice 140 is opened with a resulting increase in the flow rate of hydraulic fluid from pump 142 to the pressurized chamber 154 of the hydraulic cylinder. This results in the acceleration of ram 162 up to the point where tape 80 and lever 118 establish the required open area of flow control orifice 140 to cause ram 162 to move at the desired control velocity.

As is best seen in FIGS. 9 and 11, main flow control valve 136 includes low pressure chambers 210 and 212 which are drained back to tank via outlet ports 214 and 216 and the return lines 218 and 220 diagrammatically represented by dotted delineation in FIG. 15.

Description will now be made of the meter in by-pass system of FIG. 15 combining the function of the mechanical components with the previously described performance of the hydraulic circuitry.

The casing 20, FIG. 1, is mounted to a stationary frame, such as the frame of a machine tool and tape 80 is pulled out of the apparatus and connected to ram 162 of hydraulic cylinder 156. When pump 142 is operated the controlled feed cycle of hydraulic cylinder 156 begins when pressurized hydraulic fluid is delivered to pressurized chamber 154 of the cylinder by the hydraulic circuitry previously described.

Since synchronous motor 34, which provides an accurate reference for cylinder ram velocity, is operating it will be understood that tape 80 is metered out from the tape reel and return spring assembly 98 at a precisely fixed velocity manually established by speed adjustment knob 58 which precisely establishes the speed of tape metering drum 74 and tape metering pulley 102 which drum and pulley frictionally engage the tape and hence precisely establish the speed at which it is fed out from assembly 98.

If the velocity of ram 162 for any reason tends to increase beyond the preselected control velocity the tension in flexible tape 80 increases whereby summing pulley 90 and the left end of summing pulley lever 118 are raised above lever pivot 120. This results in the depressing of the right end of summing pulley lever 118 and the previously described valve actuating member 126, said member being clearly illustrated in FIGS. 2, 3, and 7.

When valve actuating member 126 is depressed downwardly, as viewed in FIG. 15, it depresses plunger disk 132 of the main flow control valve 136 whereby spool actuating rod 134 is moved inwardly against the action of a main flow control bias spring 186, the structural components of flow control valve 136 being clearly illustrated in FIGS. 9 through 11.

This decreases the area of and flow through flow control orifice 140 whereby the volumetric flow delivery to chamber 154 is decreased with a corresponding decrease in the velocity of cylinder ram 162.

It should be pointed out that when orifice 140 closes down the build-up in pressure differential on the ends of by-pass spool 224 of compensator valve 138 quickly opens or increases the area of by-pass orifice 174 whereby the excessive fluid delivery from pump 142 is rapidly short circuited to tank.

If the velocity of ram 162 for any reason tends to decrease beyond the preselected control velocity the tension in tape 80 decreases whereby the summing pulley 90 and lever 118 decrease the force exerted on valve plunger disk 132 of main flow control valve 136 whereby return spring 186, FIG. 10, shifts flow control spool 190 so as to increase the area of and flow through flow control orifice 140 whereby the volumetric flow delivery to load chamber 154 is increased with a corresponding increase in the velocity of cylinder ram 162.

During this lower than desired cylinder speed condition, by-pass orifice 174 of compensator spool 224 is rapidly shifted towards the closed position by return spring 172 quickly to decrease the flow rate of fluid short circuited to tank.

*The meter out restrictor flow control circuit*

Figure 16:
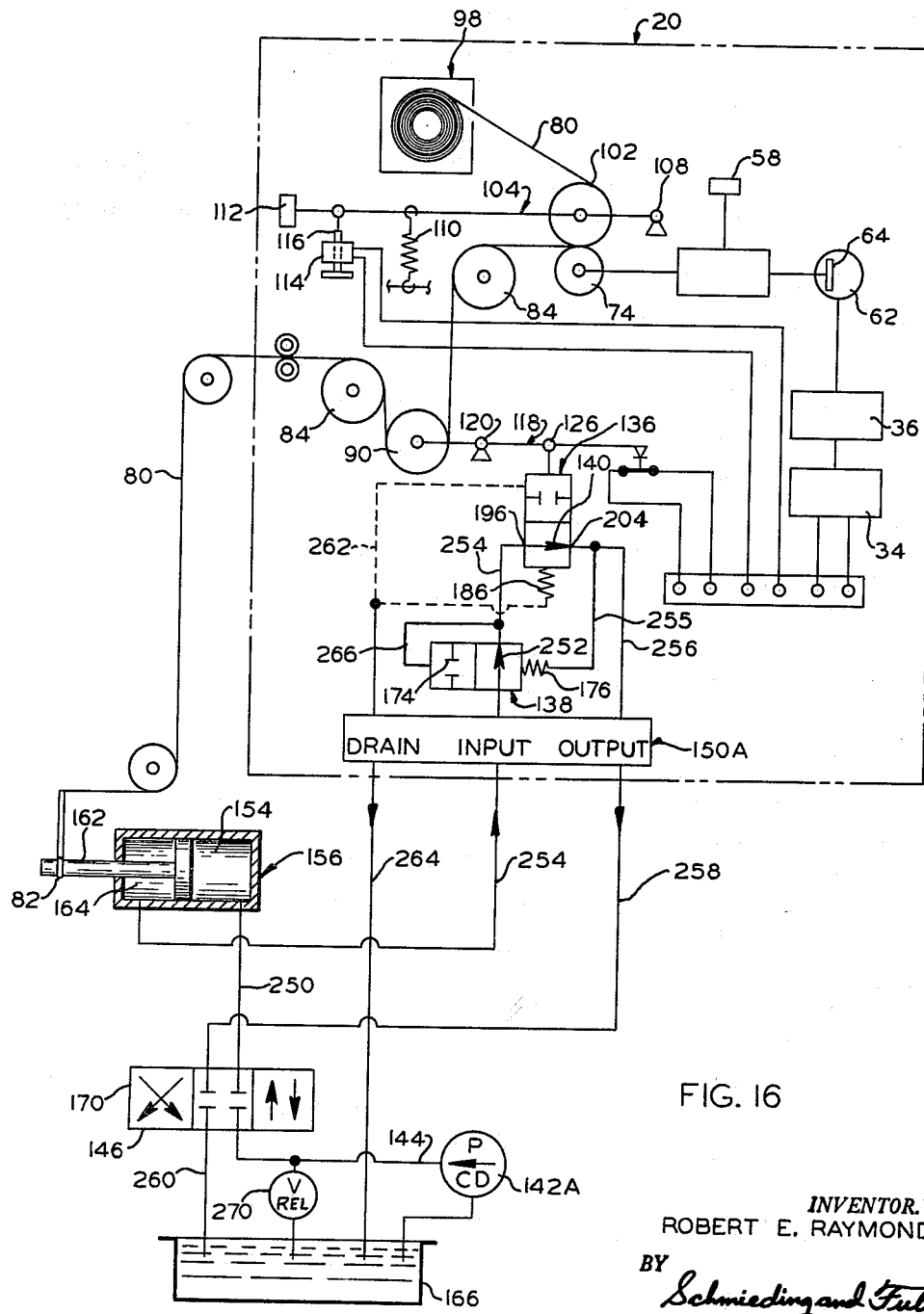
FIG. 16 is a second diagrammatic view of the apparatus of the present invention showing hydraulic circuitry for the valves to provide meter out restrictor operation.

Reference is next made to FIG. 16 which illustrates the cylinder for the control apparatus of the present invention adapted for meter out restrictor type hydraulic circuitry. Here the mechanical components of the apparatus housing 20 are identical to those previously described and the components thereof are designated by identical numerals.

The hydraulic circuitry and resulting control function differs, however, in that pressurized fluid from pump 142A is delivered directly to pressurized chamber 154 of hydraulic cylinder 156 via line 144, directional valve 170, and a line 250.

Moreover, the previously described flow control valve 136 and compensator valve 138 are utilized to control or "meter out" fluid from the previously described chamber 164 of the hydraulic cylinder.

As is best seen in FIG. 16, fluid from chamber 164 is delivered to a restrictor orifice 252 in compensator valve 138 via a line 254 and a manifold 150A.

Manifold 150A differs from manifold 150 of FIG. 15 in that the drain and input connections are reversed.

With continued reference to FIG. 16, hydraulic fluid from compensator valve 138 is delivered to flow control orifice 140 of the flow control valve via a line 254 and is released from the orifice back to tank via line 256, manifold 150A, line 258, directional valve 170, and line 260 leading to tank 166.

As is seen in FIGS. 10 and 16, the chambers 210 and 212 at the ends of the spool of the flow control valve are drained back to tank via line 262, manifold 150A, and line 264.

One end chamber 225 of compensator valve 138, FIGS. 13 and 16, receives pressurized fluid from down stream of flow control orifice 140 via a line 255 to provide a hydraulic force that augments the mechanical force exerted by return spring 176. The other end chamber 240 receives pressurized fluid from upstream of flow control orifice 140 via a line 266. The pressure differential on the opposite ends of by-passe spool 224 constantly biases the spool against the force exerted by compensator spool return spring 176.

In operation of the meter out restrictor circuit of FIG. 16, the same principle of feed back to a compensator spool from a flow control orifice is utilized. If the area of flow control orifice 140 is not mechanically varied by flexible tape 80 then the main flow control valve 136 functions as a pressure compensated restrictor type flow control valve. The operation is such that if the flow tends to increase through control orifice 140, such that the pressure drop fed back to the compensator spool 224, FIG. 13, is greater than the bias of campensator spool spring 176, then compensator spool 224 begins to close forcing the upstream pressure in cylinder drain line 254 to progress to a maximum. At the limit compensator spool 224 will close completely or close to whatever degree is necessary to maintain the preselected flow through control orifice 140. Since this control function is basically a rejection of all flow above the preselected flow control setting the upstream pressure is always maximum pressure. When the valve is regulating the use of a relief valve 270, FIG. 16, drains all excess flow to tank at maximum system pressure. This is true whether the load pressure in chamber 154 is maximum or minimum.

Since flow control orifice 140 senses only the flow actually passing through it, it does not sense the load pressure values at any particular time except for the fact that the variations in load pressure have some influence on the flow through main flow control orifice 140.

It will now be understood that compensator spool 224 in compensator valve 138 adjusts itself such that the pressure drop across the compensator valve makes up the difference between the load and the constant primary pressure.

The advantage of the restrictor type flow controlling circuit is that it is applicable for use with constant pressure variable displacement pumps of this type are adapted to center up and deliver whatever flow is required by compensator valve 138 and thereby maintain maximum pressure without wasting energy pumping excess flow through relief valve 270 back to tank.

When a fixed displacement pump is used with the system of FIG. 16 all excess flow must be by-passed to tank via the relief valve at maximum pressure with a resulting waste in power.

The restrictor type flow control circuitry of FIG. 16 has in some instances the advantage of being adapted for use in parallel load hookups that is to say that since it is a rejection type valve it can operate in parallel with other restrictor type valves whereas the previously described by-pass flow control circuitry cannot be used in parallel.

*The meter in restrictor flow control circuit*

Figure 17:
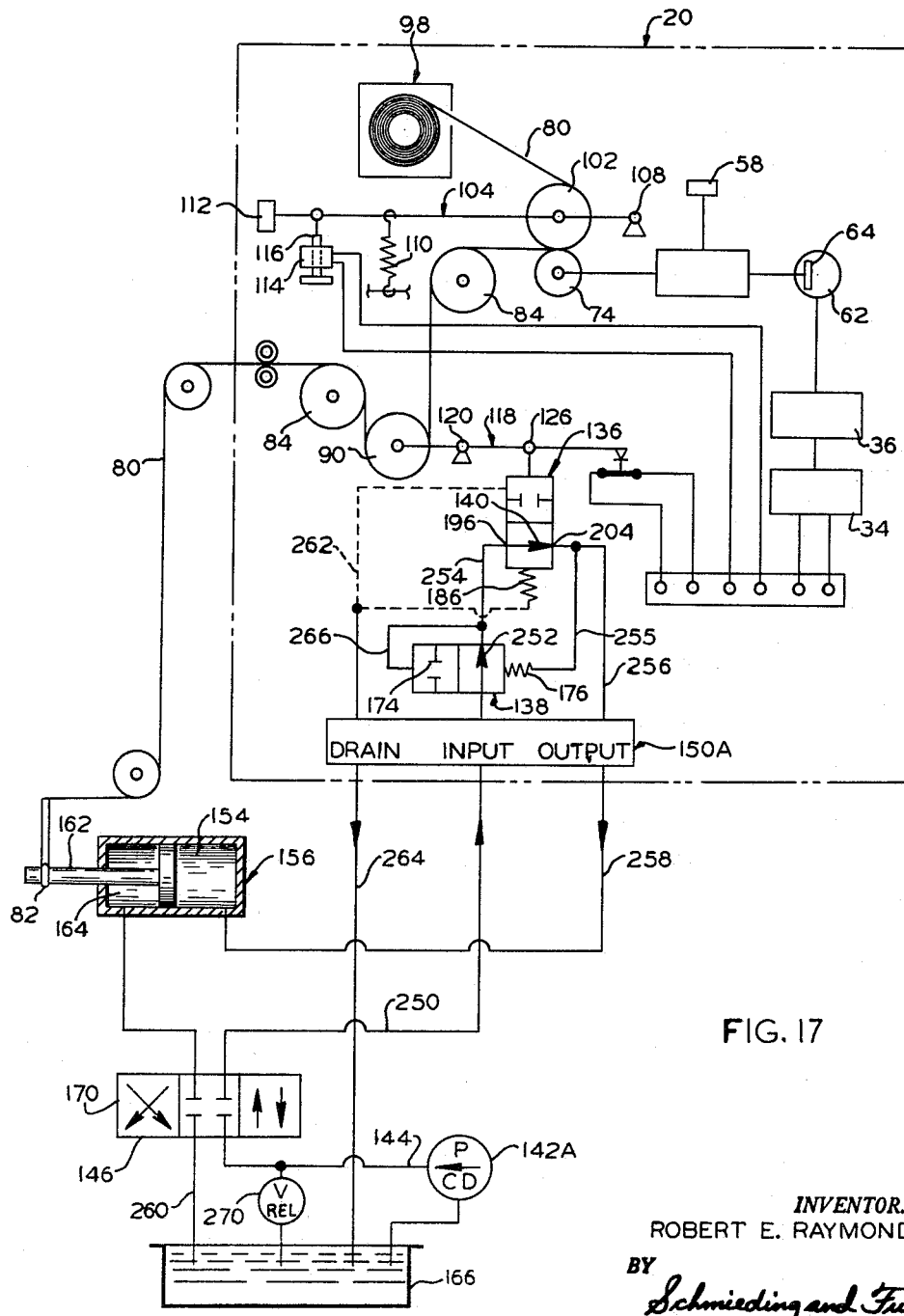
FIG. 17 is a third diagrammatic view of the apparatus of the present invention showing hydraulic circuitry for the valve to provide meter in restrictor operation.

Reference is next made to FIG. 17 which illustrates the feed control apparatus of the present invention arranged for meter in restrictor type operation.

Here the same mechanical components utilized are designated by identical numerals used in the previously described diagrammatic views of FIGS. 15 and 16.

The meter in restrictor circuitry of FIG. 17 utilizes the same valve arrangement as the meter out circuit of FIG. 16 in that compensator valve 138 is located upstream of flow control valve 136.

The system of FIG. 17 differs, however, from the system of FIG. 16 in that the valves 138 and 136 are located upstream of pressurized cylinder chamber 154, the other chamber 164 of cylinder 156 being drained directly to tank through directional valve 170.

In both of the restrictor type flow circuits of FIGS. 16 and 17 the flow control valve 136 and compensator valve 138 function in the same manner. Under some load conditions, however, the meter out restrictor circuitry of FIG. 16 does a better job since in controlling the out flow from chamber 164 of cylinder 156 the valves actually function as a dynamic brake on the hydraulic cylinder.

*The meter in by-pass circuit with phase advance option*

Figure 18:
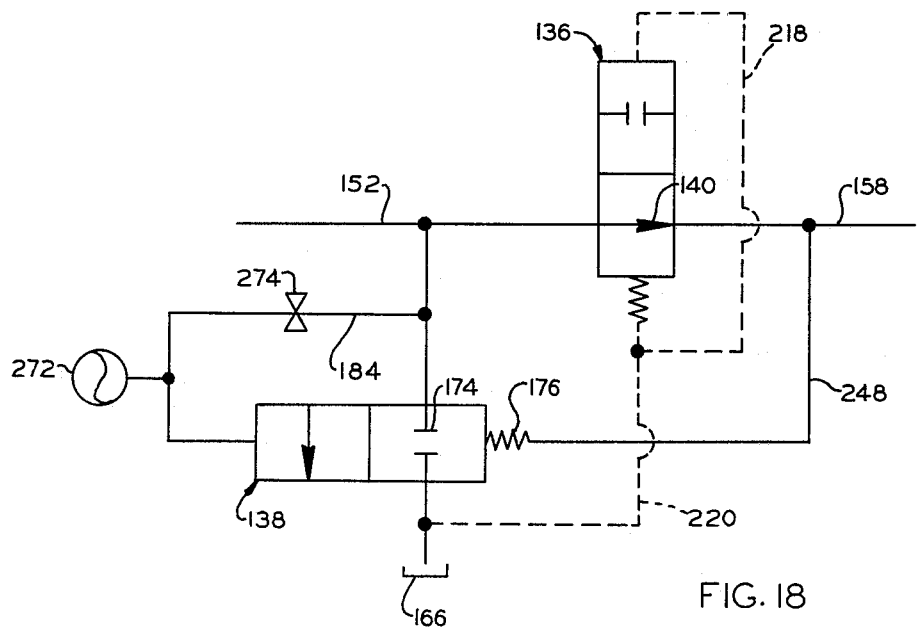
FIG. 18 is a third partial diagrammatic view showing hydraulic circuitry of the valves to provide by-pass phase advance operation.

The previously described by-pass circuitry of FIG. 15 can be modified as shown in FIG. 18 to include a phase advance option that is applied to compensator valve 138 by including an accumulator 272 and orifice 274 in line 184 which delivers fluid for the hydraulic bias of the spool of compensator valve 138, as previously described, in opposition to spring 176.

The function of accumulator 272 and orifice 274 in the feed back line 184 leading to the bypass spool of valve 138 is such as to delay the pressure build up on the left side of the spool in instances where the rate of pressure build up is in excess of some predetermined value.

Under normal slow fluctuations in system pressure, orifice 274 and accumulator 272 have no effect on the system. However, if the pressure begins to change very rapidly which would be the case if cylinder 156 suddenly encounters a steep load the question arises as to how fast it is proper for the by-pass spool in compensator valve 138 to close in order to resist such sudden load and prevent stalling out of cylinder 156 until the by-pass spool in valve 138 closes sufficiently to develop pressure to meet the load condition. This orifice and accumulator arrangement, since it delays the pressure build up on the left side of the spool serves to increase the pressure difference across the spool in the direction of the spring force exerted by a spring 176. This results in faster closing of by-pass orifice 174 in compensator valve 138 as a function of rate of change of pressure. Also, orifice 174 will open when the rate of change of pressure decreases thereby increasing the rate of response of the by-pass spool in compensator valve 138 when high frequency pressure fluctuations occur. In other words, the spool in compensator valve 138, when provided with accumulator 272 and orifice 274 can anticipate the build up of load or the loss of load as a function of the rate of change of pressure in the system and by-pass orifice 174 can either close or open faster under this derivative situation than would be the case under proportional conditions.

*The meter in by-pass circuit with phase lag option*

Figure 19:
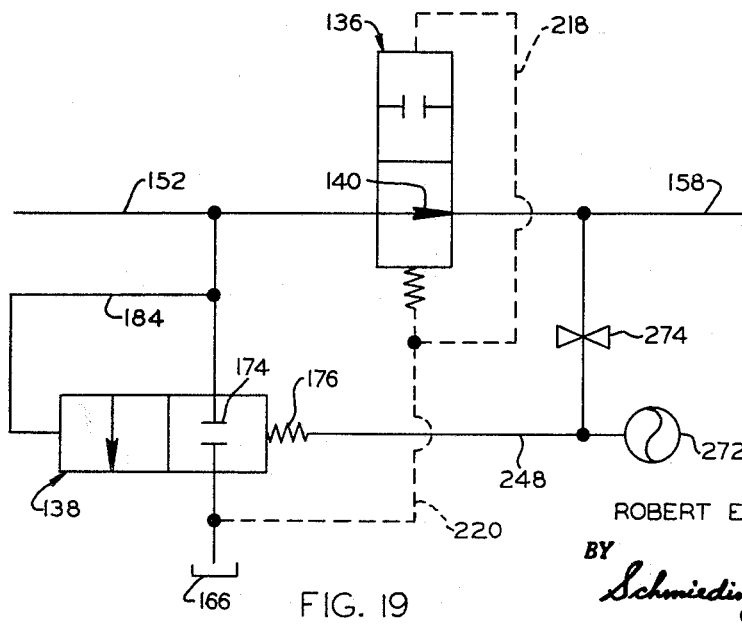
FIG. 19 is a fourth partial diagrammatic showing hydraulic circuitry of the valves to provide by-pass phase lag operation.

Reference is next made to FIG. 19 which illustrates a phase lag option that employs the same circuitry and apparatus as the system of FIG. 15 except that an accumulator 272 and orifice 274 are included in line 248 leading back to the right end of the by-pass spool in compensator valve 138.

This phase lag arrangement, FIG. 19, just reverses the phase lead operation. On rapid rise of the load the accumulator, orifice combination delays closing of the spool and thereby delays the action of the by-pass spool in compensator valve 138 in responding to a build up in the load pressure at cylinder 156.

Moreover, if the load and pressure cylinder 156 is lost, accumulator 272 serves to hold by-pass orifice 174 in compensator spool 138 closed until it discharges through damping orifice 274.

A choice between the phase advance option of FIG. 18 and the phase lag option of FIG. 19 depends primarily on the hydraulic circuit. Generally speaking, the phase advance option is used in instances of rapidly fluxuating load conditions in order to maintain proper control. In some cases, however, the phase lag option is desirable as is the case with new servo-mechanism, when there is a possibility of instability in certain frequencies of operation. Such instabilities can either be handled by adjusting the total gain or sensitivity of the servo-mechanism or by shifting the phase by techniques such as have just been outlined. In order to obtain high accuracy of D.C. conditions, which is the fundamental reason for utilizing servo-techniques, it is necesary to use phase lead and phase lag options in order to achieve stability in high gain situations.

*The restrctor type circuit with phase advance option*

Figure 20:
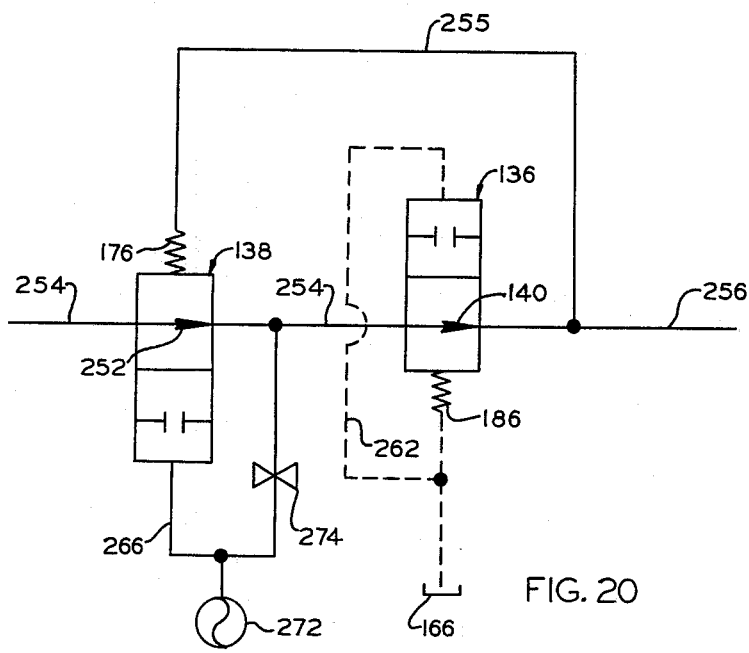
FIG. 20 is a partial diagrammatic view showing hydraulic circuitry of the valves to provide restrictor phase advance operation.

Reference is next made to FIG. 20 which illustrates a modification of the meter out restrictor circuit of FIG. 16 or the meter in restrictor circuit of FIG. 17 wherein a phase advance circuit function is achieved by adding accumulator 274 and damping orifice 272 in the line 266 that feeds fluid back to the end of the by-pass spool in compensator valve 138.

With this arrangement there is a delay in pressure build up on the end of the by-pass spool whereby the by-pass spool will open very rapidly since the system pressure is applied in the direction of the spring force and the by-pass spool tends to move towards the accumulator which provides resiliency to the fluid column and permits a "flash open" effect. This means that the by-pass spool in compensator valve 138 opens much more rapidly than if spring force alone were utilized to open the compensator spool in response to pressure drops across flow control orifice 140.

It should be pointed out that in the system of FIG. 20 there is no phase advance and the point at which a phase advance occurs is a function of the size of damping orifice 274 and accumulator 272. These system elements can of course be tailored to meet a certain specific frequency at which instability may occur.

*The restrictor type circuit with phase lag option*

Figure 21:
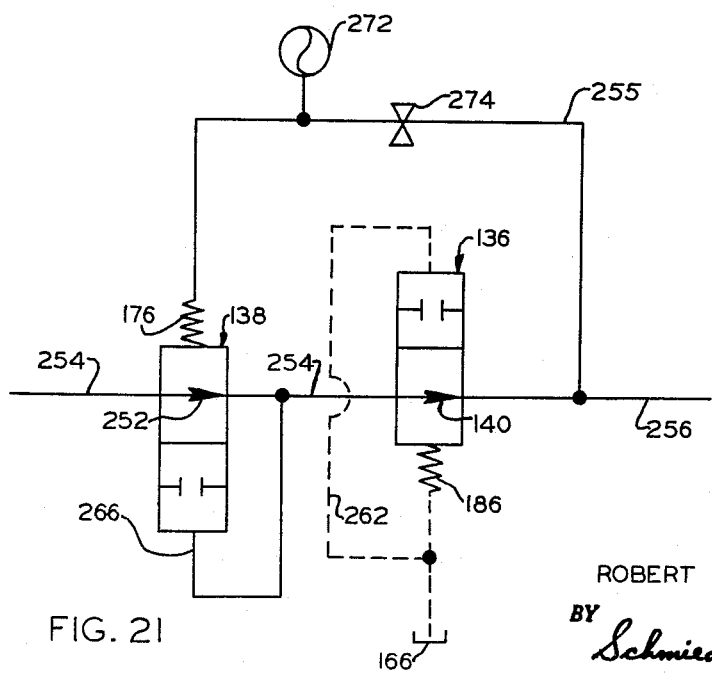
FIG. 21 is a second partial diagrammatic view showing hydraulic circuitry of the valves to provide restrictor phase lag operation.

Reference is next made to FIG. 21 which illustrates a modification of the meter-out restrictor circuit of FIG. 16 or the meter in restrictor circuit of FIG. 17 which provides a phase lag function of compensator valve 138. The function here is the opposite of the phase lead option for the restrictor circuit of FIG. 20 in the sense that if the load tends to rise suddenly causing an increase in pressure in line 256 lack of pressure on the spring side of the by-pass spool in compensator valve 138 permits the spool to move very fast, much faster than if the spring side of the spool were connected directly to the load line 256 without the presence of orifice 274 and accumulator 272. It will, therefore, be understood that restrictor orifice 252 will close much faster with such closing being a function of the rate of pressure rise which is in effect anticipating the actual load pressure.

In summary, in all the phase advance and phase lag operations the accumulating action of element 272 can be obtained with oil capacity, spring loaded pistons, or gas loaded accumulators. Any of these can be used in combination with any kind of resistance of proper value. The resistance or orifice element 274 can be provided by a simple orifice or long drilled hole whereby the resistance can be of various viscosity or turbulent types all having different linear characteristics. In all instances, however, it can be assumed that the orifice and accumulator are linear around a particular operating point and thereby function in the manner of a resistance and condensor in an electrical circuit in that the combination has a certain time constant or frequency response.

In summary, it should be pointed out that the main flow control orifice 140 in the hydraulic system of the present control apparatus is constantly monitored by the mechanical components of the system and variations in the mechanical conditions and fluid characteristics are compensated for. The mechanical tape control apparatus, however, takes some time to make the required corrections in velocity and position of the load for example the displacement of the main flow control valve 136 by the mechanical linkage is the integral of the difference in flow rate and the speed of the synchronous timing motor 34. Hence it will be understood that since the problem is one of integraton it takes some small appreciable time for the signals to be transmitted to the flow control valve 136 in order to apply compensating corrections since the flexible tape 180 operates only on the main flow control orifice 140 it merely readjusts signals to flow control orifice 140 which are then fed to compensator valve 138.

It then follows that at any particular instant, regardless of what the flexible tape 80 is doing, compensator spool 224 in compensator valve 136 is measuring the flow through flow control orifice 140. If the pressure in the hydraulic system changes, for any reason whatsoever, such as load disturbance or sudden changes in load, then compensator spool 224 makes immediate corrections of the pressure balances of the system in order to maintain constant flow through control orifice 140 for the particular predetermined setting at that instant. This means that compensator valve 138 is, in effect, giving a phase advance to the situation since it is reacting to pressure changes that would create flow rate changes at the particular instant.

It should be pointed out that if the compensator valve 138 were not included in the systems it would be necessary to adjust flow control orifice 140 through its complete range of open area, from closed to its maximum opening, depending on the particular load conditions imposed on the system. If the load suddenly increases, without the inclusion of a compensator valve 138, the tape would have to move sufficiently far enough to open the orifice enough to permit full pressure at the hydraulic cylinder driving the load. If the load is suddenly decreased, without a compensator valve, the tape would have to integrate the control orifice to a completely closed position in order to directly control the flow. This means that the overall hydraulic system would tend to lope or oscillate in rather violent and large amplitude in order to follow fluctuations in system pressures. In other words, pressure operated flow control valves are good enough to handle relatively instantaneous situations but the main difficulty revolves around obtaining the ultimate in high accuracy control below five percent, the latter being realized through the use of the flexible tape. In other words, since the present apparatus utilizes a tape to control a pressure compensated feed-back valve arrangement, rather than a simple orifice, a high degree of control accuracy is achieved in a practical manner.

While the form of embodiment of the present invention as herein disclosed constitutes a preferred form, it is to be understood that other forms might be adopted, all coming within the scope of the claims which follow.

I claim:

1. A fluid motor control apparatus comprising, in combination, frame means; a hydraulic circuit including a source of pressurized fluid and a reservoir; a fluid motor in said hydraulic circuit; flow control valve means in said hydraulic circuit and including a moveable main flow control element for controlling the flow of hydraulic fluid therein; flexible strip metering means mounted on said frame and including an operator associated with said flow control element; a flexible strip engaging said strip metering means and including a first end for connection with the output shaft of said fluid motor and a second end; strip return means connected to said second end of said flexible strip; and a synchronous prime mover for operating said strip metering means at a constant reference speed.

2. The fluid motor control apparatus defined in claim 1 wherein said flow control valve means includes a flow control orifice in said hydraulic circuit between said source and said fluid motor; and a compensator valve means including a compensator orifice having an inlet connected with said circuit upstream of said first orifice and an outlet connected with said reservoir, said compensator valve means including a movable compensator flow control element exposed to pressurized fluid in said circuit.

3. The fluid motor control apparatus defined in claim 1 wherein said flow control valve means includes a flow control orifice in said hydraulic circuit between said source and said fluid motor; a compensator valve means including a compensator orifice having an inlet connected with said circuit upstream of said first orifice and an outlet connected with said reservoir, said compensator valve means including a movable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element.

4. The fluid motor control apparatus defined in claim 1 wherein said flow control valve means includes a flow control orifice in said hydraulic circuit between said source and said fluid motor; a compensator valve means including a compensator orifice having an inlet connected with said circuit upstream of said first orifice and an outlet connected with said reservoir, said compensator valve means including a movable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element, said damping orifice and accumulator being connected in said circuit upstream of said flow control orifice.

5. The fluid motor control apparatus defined in claim 1 wherein said flow control valve means includes a flow control orifice in said hydraulic circuit between said source and said fluid motor; a compensator valve means including a compensator orifice having an inlet connected with said circuit upstream of said first orifice and an outlet connected with said reservoir, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element, said damping orifice and accumulator being connected in said circuit downstream of said flow control orifice.

6. The flow control apparatus defined in claim 1 wherein said flow control valve means includes a flow control orifice connected in said circuit between said fluid motor and said reservoir; and a compensator valve means including a compensator orifice connected in series with said flow control orifice, said compensator valve means including a movable compensator flow control element exposed to pressurized fluid in said circuit.

7. The fluid motor control apparatus defined in claim 1 wherein said flow control valve means includes a flow control orifice in said hydraulic circuit between said source and said fluid motor; a compensator valve means including a compensator orifice connected in series with said flow control orifice, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element.

8. The fluid motor control apparatus defined in claim 1 wherein said flow control valve means includes a flow control orifice in said hydraulic circuit between said source and said fluid motor; a compensator valve means including a compensator orifice connected in series with said flow control orifice, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element, said damping orifice and accumulator being connected in said circuit upstream of said flow control orifice.

9. The fluid motor control apparatus defined in claim 1 wherein said flow control valve means includes a flow control orifice in said hydraulic circuit between said source and said fluid motor; a compensator valve means including a compensator orifice connected in series with said flow control orifice, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element, said damping orifice and accumulator being connected in said circuit downstream of said flow control orifice.

10. The flow control apparatus defined in claim 1 wherein said flow control valve means includes a flow control orifice located in said circuit between said source and said fluid motor; and a compensator valve means including a compensator orifice in series with said flow control orifice, said compensator valve means including a moveable compensator flow control orifice exposed to pressurized fluid in said circuit.

11. The fluid motor control apparatus defined in claim 1 wherein said flow control valve means includes a flow control orifice in said hydraulic circuit between said source and said fluid motor; a compensator valve means including a compensator orifice in series with said flow control orifice, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element.

12. The fluid motor control apparatus defined in claim 1 wherein said flow control valve means includes a flow control orifice in said hydraulic circuit between said source and said fluid motor; a compensator valve means including a compensator orifice in series with said flow control orifice, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element, said orifice and accumulator being connected in said circuit upstream of said flow control orifice.

13. The fluid motor control apparatus defined in claim 1 wherein said flow control valve means includes a flow control orifice in said hydraulic circuit between said source and said fluid motor; a compensator valve means including a compensator orifice in series with said flow control orifice, said compensator valve means including a moveable compensator flow control element exposed to pressurized fluid in said circuit; a damping orifice in said circuit for controlling the flow of pressurized fluid to said compensator flow control element; and an accumulator in said circuit for controlling the flow of fluid to said compensator flow control element, said orifice and accumulator being connected in said circuit downstream of said flow control orifice.

14. A fluid motor control apparatus comprising, in combination, frame means; a hydraulic circuit including a source of pressurized fluid and a reservoir; a fluid motor in said hydraulic circuit; flow control valve means in said hydraulic circuit and including a moveable main flow control element for controlling the flow of hydraulic fluid therein; flexible strip metering means mounted on said frame and including an operator associated with said flow control element; a flexible strip engaging said strip metering means and including a first end for connection with the output shaft of said fluid motor and a second end of said flexible strip; a synchronous prime mover for operating said strip metering means at a constant reference speed; and clutch means for disengaging said flexible strip metering means from said flexible strip.

15. A fluid motor control apparatus comprising, in combination, frame means; a hydraulic circuit including a source of pressurized fluid and a reservoir; a fluid motor in said hydraulic circuit; flow control valve means in said hydraulic circuit and including a moveable main flow control element for controlling the flow of hydraulic fluid therein; flexible strip metering means mounted on said frame and including an operator associated with said flow control element; a flexible strip engaging said strip metering means and including a first end for connection with the output shaft of said fluid motor and a second end; strip return means connected to said second end of said flexible strip; a synchronous prime mover for operating said strip metering means at a constant reference speed; and variable speed driving means operative between said prime mover and said strip metering means.

16. A fluid motor control apparatus comprising, in combination, frame means; a hydraulic circuit including a source of pressurized fluid and a reservoir; a fluid motor in said hydraulic circuit; flow control valve means in said hydraulic circuit and including a moveable main flow control element for controlling the flow of hydraulic fluid therein; flexible strip metering means mounted on said frame and including an operator associated with said flow control element; a flexible strip engaging said strip metering means and including a first end for connection with the output shaft of said fluid motor and a second end; strip return means connected to said second end of said flexible strip; a synchronous prime mover for operating said strip metering means at a constant reference speed; clutch means for disengaging said flexible strip metering means from said flexible strip; and variable speed driving means operative between said prime mover and said strip metering means.

17. A fluid motor control apparatus comprising, in combination, frame means; a hydraulic circuit including a source of pressurized fluid and a reservoir; a fluid motor in said hydraulic circuit; flow control valve means in said hydraulic circuit and including a moveable main flow control element for controlling the flow of hydraulic fluid therein; flexible strip metering means mounted on said frame and including an operator associated with said flow control element; a flexible strip engaging said strip metering means and including a first end for connection with the output shaft of said fluid motor and a second end; strip return means connected to said second end of said flexible strip; a synchronous prime mover for operating said strip metering means at a constant reference speed; clutch means for disengaging said flexible strip metering means from said flexible strip; and a clutch operator operatively associated with said flexible strip metering means for disengaging said clutch.

18. A fluid motor control apparatus comprising, in combination, frame means; a hydraulic circuit including a source of pressurized fluid and a reservoir; a fluid motor in said hydraulic circuit; flow control valve means in said hydraulic circuit and including a moveable main flow control element for controlling the flow of hydraulic fluid therein; pulley means mounted to said frame means and including a summing pulley; summing pulley mounting means moveably mounted on said frame means; a flexible strip engaging said pulley means and summing pulley and including a first end for connection with the output shaft of said fluid motor and a second end; resilient strip return means connected to said second end of said flexible strip; a synchronous prime mover for operating said pulley means at a constant reference speed; and valve actuating means operatively connecting said flow control element with said summing pulley mounting means.

19. The fluid motor control apparatus defined in claim 18 that includes clutch means for disengaging said flexible strip from said pulley means.

20. The fluid motor control apparatus defined in claim 18 that includes a variable speed drive for said pulley means.

21. The fluid motor control apparatus defined in claim 18 that includes clutch means for disengaging said flexible strip from said pulley means; and a variable speed drive for said pulley means.

22. The fluid motor control apparatus defined in claim 18 that includes a clutch means for disengaging said pulley means from said flexible strip; and operator for said clutch means.

References Cited by the Examiner

UNITED STATES PATENTS

| 2,441,925 | 5/48 | Wege | 91—383 |
| 2,761,285 | 9/56 | Beecroft | 91—383 |
| 2,764,869 | 10/56 | Scherr | 91—383 |

FRED E. ENGELTHALER, *Primary Examiner.*

SAMUEL LEVINE, *Examiner.*